June 16, 1959 S. ROGERS ET AL 2,891,214

IDEAL TRANSFORMER

Filed July 9, 1956

INVENTORS
STANLEY ROGERS &
TOIVO M. DANNBACK
BY
Walter J. Jason
ATTORNEY

United States Patent Office 2,891,214

Patented June 16, 1959

2,891,214

IDEAL TRANSFORMER

Stanley Rogers and Toivo M. Dannback, San Diego, Calif., assignors to General Dynamics Corporation, San Diego, Calif., a corporation of Delaware Application July 9, 1956, Serial No. 596,605

11 Claims. (Cl. 323—44)

This invention relates to ideal transformers and more particularly to transformers in which compensation is made for phase shifts, voltage-ratio error, power losses, and leakage between windings in the primary and secondary windings.

In copending application No. 593,889 for a Current Loss Compensating Device filed June 26, 1957, there is taught the use of a negative impedance between two points having a current loss. This impedance was adjustable in phase and magnitude to compensate for the current loss between the two points. There was also disclosed suitable circuitry whereby this negative impedance might be used in correcting for each of the several types of error or losses in a transformer. While this was advantageous when certain of the errors were beyond desired allowable limits, if all errors were too great or if the errors could not be isolated, then a correction circuit was needed for each error. This resulted in complex circuitry and bulky corrective packaging as would readily become apparent in using the circuit of Figure 4 of the copending application five times in correcting for the five types of error in a single transformer.

The present invention utilizes simplified circuitry and components in correcting for all transformer errors. The ideal transformer comprising the present invention includes three inexpensive transformers, passive networks, a simple electronic correction generator, and a simple auxiliary amplifier. The correction generator compensates for phase shifts, voltage-ratio error, and power losses. The auxiliary amplifier cancels leakage loss to ground and between primary and secondary windings. Means is also provided for adjusting the voltage-ratio as desired. In the best commercially available computing transformers, errors of the order of one percent may be expected. One ideal transformer, employing the principles of this invention with a resistive loading on the secondary varying from 500 ohms to 50,000 ohms, had a phase shift of 0.75 degree maximum and the voltage-ratio error and power loss were each within a 0.2 percent maximum. (A conventional transformer would require a 3-ton core having a permeability of 100,000 to equal this performance.) This test model used as one of its components a transformer before correction having 1.5° phase error and a power loss of 2.5% with the secondary load restricted to the narrow range of 1,000 to 5,000 ohms. Under static conditions, when the five adjustments had been made, the ideal transformer had the desired transformation ratio, the primary and secondary currents were in phase and there were no measurable power losses in the transformer. From all appearances and tests, it appeared to be an ideal transformer, i.e., a transformer totally without error.

It is therefore an object of this invention to provide for an improved transformer wherein its errors have been corrected.

Another object is the provision of an ideal transformer wherein there is suitable shielding and isolation to correct for leakage losses to ground and between primary and secondary windings.

Another object is the provision of an ideal transformer wherein a correction current means compensates for phase shifts, voltage-ratio error and power losses in the transformer and adjustment circuitry.

Still another object is the provision of an ideal transformer wherein the errors therein have been corrected with simplified circuitry, using compact and inexpensive components which are easy to assemble and reliable in operation.

Other objects and features of the present invention will be readily apparent to those skilled in the art from the following specification and appended drawing wherein is illustrated a preferred form of the invention, and in which.

Figure 1:
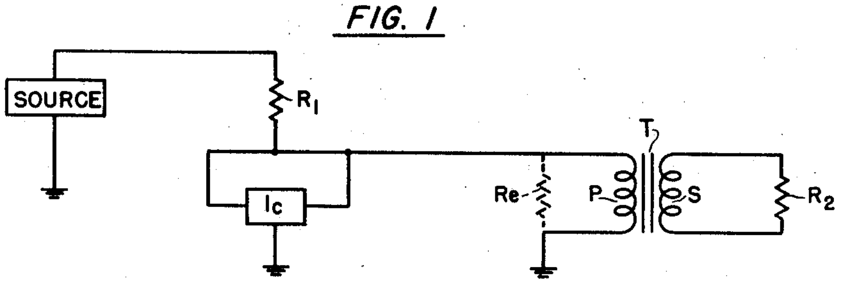
Figure 1 is a simplified diagram used to explain the problem involved.

Referring now to the drawing wherein like numerals designate like parts throughout the several views, there is shown in Figure 1 an energy source connected to the primary P of transformer T through a resistance $R_1$ of known value. Across the secondary S is connected another resistor $R_2$. If the transformation ratio is 1:1, if the resistors are of equal value, and if there were no transformer losses, the voltage drop across resistors $R_1$, $R_2$ would be equal. However, because of transformer losses, represented as being through resistor $R_e$, the voltage drop across $R_2$ will not equal that across $R_1$. To correct for these losses, correction current generator $I_c$ is adjusted to supply additional current to the primary P. When the voltage drop across $R_2$ equals that across $R_1$, the losses have been compensated by the additional current and the transformer T is considered to have been corrected. While Figure 1 shows generally what is sought to be accomplished by the principles of the present invention, it does not correct for all of the individual errors normally found in transformers. For example, with one side of the secondary winding connected to ground and the primary through large resistances to ground as is normally done in computing applications, there are relatively large leakage currents flowing between primary and secondary windings.

In an uncorrected transformer there are five types of errors as follows:

A. Effective leakage inductance and winding resistances of both primary and secondary windings.

B. The finite inductance of the primary, the distributed capacitance of the primary and the power absorbing elements not included in item A.

C. The leakage resistance and capacitance between the primary winding and ground.

D. The same elements between the secondary winding and ground.

E. Interwinding capacitance and leakage resistance. To these errors should be added losses F in the corrective circuits for which compensation must be made.

Figure 2:
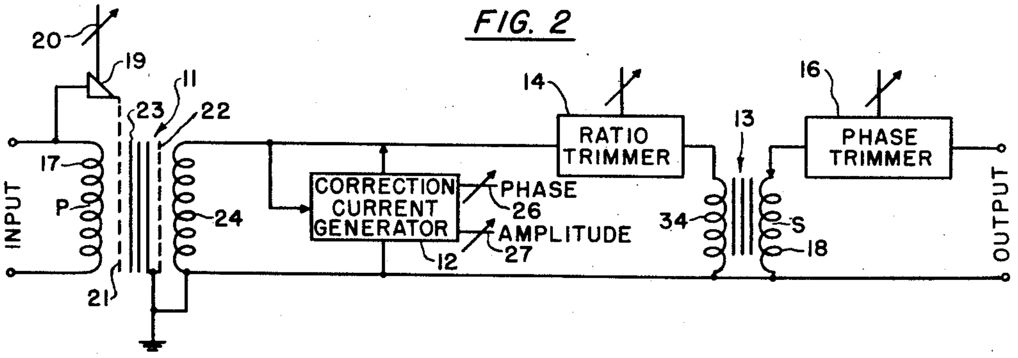
Figure 2 is a schematic and block diagram of the invention.

In Figure 2 there is shown schematically and in block diagram the circuitry used in correcting all five types of errors. The ideal transformer is considered to be all that is shown from the input terminals at the left to the output terminals on the right and consists of a special isolating transformer 11, correction current generator 12, conventional transformer 13, ratio trimmer 14, and secondary phase trimmer 16. The primary 17 of transformer 11 is also considered as the primary P of the ideal transformer, which includes all that shown in Figure 2. The secondary winding 18 of transformer 13 is also considered to be the secondary S of the ideal transformer.

The isolating transformer 11 consists of primary winding 17, adjustable gain amplifier 19 having a very high input impedance, internal shields 21 and 22, core 23 and secondary winding 24. Amplifier 19 connects primary shield 21 to the primary winding 17 while core 23, secondary shield 22 and secondary winding 24 are all connected to ground. It should be noted that the secondary winding 24 is next to the core 23 since they are both grounded and there can thus be no effective capacitance between the two. Amplifier 19 is adjustable in gain by control 20 and should be set so that there is no net current flow between primary 17 and shield 21. The current between shield 22, core 23 and coil 24 is corrected by current generator 12. Shields 21 and 22 isolate coils 17 and 24 from each other. Thus, the only coupling between coils 17 and 24 is the coupling of the shields 21 and 22. This coupling or current between the shields is supplied by the amplifier 19 and not from coil 17. Therefore, no leakage current due to resistance and capacity coupling passes from primary 17 to secondary 24. However, since the shields are of a nonmagnetic material the desired magnetic field lines will remain practically undisturbed. The isolation transformer is the subject matter of copending application No. 598,270, filed July 17, 1956, and having a common Assignee. Resistance 25 is merely the impedance of other circuitry to which this may be connected and is not considered as a part of the invention.

Figure 3:
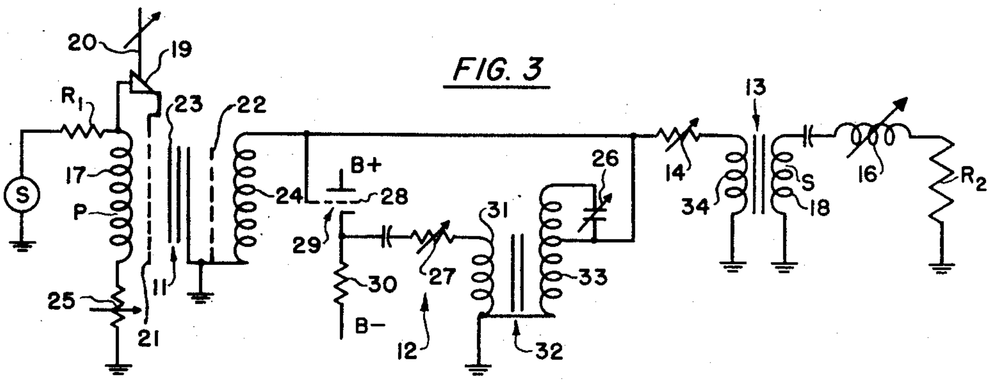
Figure 3 shows the circuitry involved in correcting the transformer.

The correction current generator 12 is connected in parallel with the secondary winding 24 of the isolation transformer. This generator varies its current flow according to the voltage of its input terminal. It supplies primary phase correction and power through phase and amplitude controls 26, 27 to make up for losses in the ratio trimmer 14 and other parts of the transformer. One type of correction current generator is shown in Figure 3 as a cathode follower, step-up transformer circuit. Here the grid 28 of tube 29 is connected to the secondary 24 and trimmer 14 which, in this manner, controls the current flow through resistor 30. This resistor, in turn, determines the voltage drop across primary 31 of step-up transformer 32. The magnitude of the current flow in primary 31 is further controlled by amplitude control 27 which may be a variable resistance, for example. Across part of the windings of the secondary 33 is the phase adjustment 26 shown as a variable capacitance, for correctiing primary phase error. Secondary 33 supplies additional current to the two transformer windings 24 and 34 connected to it, supplying power to make up for circuit and transformer losses. Winding 34 is the primary winding of a conventional transformer 13. The voltage ratio of the ideal transformer is generally determined by the number of turns of the primary winding P(17) and the turns of the secondary winding S(18). The secondary has a number of taps so that the ratio may be changed as desired. Ratio trimmer 14 is additionally used to vary the current entering the primary 34 of transformer 13 so that the effective transformation ratios may be varied continuously between the taps on the secondary 18, which is also the secondary S of the ideal transformer comprising one of the features of this invention. The remaining correction to be made, adjusting the secondary current to be in phase with the voltage, is with the phase trimmer 16, shown as an L-C network, in the output path of the secondary S.

The ideal transformer is corrected by five adjustments. First, the gain of the amplifier 19 is set by control 20 until there is a zero net current between the primary winding 17 and shield 21. Second, the phase trimmer 16 is set so the secondary current is in phase with the secondary voltage. Next the phase adjustment 26 and amplitude adjustment 27 are separately adjustable to correct for the circuit and transformer losses. Then the ratio trimmer 16 is set to adjust to the desired effective transformation ratio. When these five adjustments have been made the five types of errors earlier discussed have been compensated and the $I^2R$ across $R_1$ is equal to the $I^2R$ across $R_2$. With no measurable losses the transformer is considered perfect. The ideal transformer of this invention operates under these conditions.

While certain preferred embodiments of the invention have been specifically disclosed, it is understood that the invention is not limited thereto as many variations will be readily apparent to those skilled in the art and the invention is to be given its broadest possible interpretation within the terms of the following claims:

We claim:

1. Apparatus for simulating an ideal transformer comprising a first transformer having primary and secondary windings, said primary winding forming the input terminals to said apparatus, a second transformer having primary and secondary windings, said secondary winding forming the output terminals of said apparatus, and circuit means interconnected with the secondary winding of said first transformer and the primary winding of said second transformer, said circuit means having means therein for providing additional energy to said primary winding of said second transformer whereby a signal appearing on said output terminals corresponds to a signal produced by an ideal transformer, said circuit means comprising a correction current generator whose input is connected to the secondary of said first transformer and whose output is connected to said first transformer secondary and to the primary of said second transformer, said generator providing a correction current proportional to its input from said first transformer secondary, amplitude and phase control means in the output of said generator for adjusting the phase and amplitude of said correction current, a second amplitude control means for controlling the amount of combined correction current and current from said first transformer secondary into the primary of said second transformer, and means in the output of the secondary of said second transformer for adjusting the phase of said output.

2. Apparatus for simulating an ideal transformer having no measurable error or loss comprising an input terminal and an output terminal, a primary winding connected to said input terminal, a secondary winding having taps thereon and phase shift correction circuit serially connected to said output terminal, shielding means electrically connected to said primary winding and positioned intermediate said windings for compensating for leakage losses to ground and between said windings, and circuit means between said primary and said secondary for electrically coupling them together, said circuit means providing a correction current to compensate for ratio error and power losses and to provide for continuous ratio adjustment between said taps on said secondary winding.

3. Apparatus for simulating an ideal transformer comprising an isolation transformer having primary and secondary windings, said primary winding forming the input terminals to said apparatus, a second transformer having primary and secondary windings, said second transformer secondary winding forming the output terminals of said apparatus, circuit means interconnecting the secondary of said isolation transformer and the primary winding of said second transformer, said isolation transformer including a core and secondary shield connected to ground, a primary shield, and variable amplifying means connecting said primary shield to said primary of said isolation transformer for control thereby to compensate for leakage losses to ground and between primary and secondary windings of said isolation transformer.

4. Apparatus for simulating an ideal transformer having no measurable error or losses comprising a transformer having a primary and a secondary winding, means connected to said secondary for correcting phase shifts, circuit means coupling said primary to said secondary and providing additional current to said transformer to compensate for ratio error and power losses, and current means connected to the primary of said transformer for compensating for leakage losses to ground and between primary and secondary windings.

5. Apparatus for simulating an ideal transformer as in claim 4, said phase shift correction means comprising an adjustable L-C network connected to said secondary windings, said circuit means including a power source for providing a current of adjustable magnitude and in phase with current in said primary windings, said current means comprising a shield inwardly of said primary in said transformer, and a primary controlled variable gain amplifier driving said shield.

6. Apparatus for simulating an ideal transformer comprising a first transformer having primary and secondary windings, said primary winding forming input terminals to said apparatus, a second transformer having primary and secondary windings, said second secondary winding forming the output terminals of said apparatus, adjustment circuitry to compensate for phase shifts, ratio error and power losses and for providing for transformation ratio adjustment, said circuitry including a current correction generator connected in parallel with the secondary of said first transformer and to the primary of said second transformer, said generator varying in current flow according to the voltage drop across the secondary of said first transformer, said generator having current and phase adjusting means for controlling its output, said adjustment circuitry including phase adjusting means in the output of said secondary of said second transformer.

7. Apparatus for simulating an ideal transformer comprising an isolation transformer having shielded primary and secondary windings, said primary winding forming the input terminals to said apparatus, a variable gain amplifier connecting said primary to its corresponding shield, a second transformer having primary and secondary windings, said secondary winding of said second transformer forming the output terminals of said apparatus, a current regulating control, said secondary of said first transformer being connected to said primary of said second transformer through said current regulating control, and a current correction source responsive to the potential drop across said secondary of said first transformer for supplying an additional current through said current regulating control to said second transformer secondary, said current correction source having an amplitude control and phase correction control, a phase correction control in the output of said secondary of said second transformer, a resistance in the circuit of said primary of said first transformer from which measurements may be made of the energy delivered thereto, a resistance across said secondary of said second transformer from which measurements may be made of the energy delivered therefrom, said amplifier, said current regulating control, said current amplitude and phase controls, and said phase correction control in the secondary output all being operable to make the energy values across both said resistors of equal value.

8. In an ideal transformer having no measurable error or loss, in combination, a primary and secondary winding, means serially connected to said secondary for compensating for phase shifts, means coupled between said primary and said secondary for compensating for ratio error and power losses, means connected to said primary for compensating for leakage losses to ground and between primary and secondary windings, said ratio error compensating means also providing continuous ratio adjustment between taps on the secondary winding.

9. In an ideal transformer as in claim 8, said ratio error compensating including a current amplitude control for varying current flow in said secondary winding of said ideal transformer independently of current flow in said primary.

10. In a variable ratio transformer, means for adjusting the transformation ratio thereof comprising a first transformer whose primary is the primary of the variable ratio transformer, a second transformer whose secondary is the secondary of said variable ratio transformer, a multiple of taps on said secondary for selection of a turns ratio, circuit means connecting the secondary of said first transformer with the primary of said second transformer, said circuit means including a current control means for regulating the current flow through said primary of said second transformer, said circuit means including a current source connected to said primary of said second transformer through said current control means for additionally supplying current to said second transformer primary as desired.

11. In a variable ratio transformer, means for adjusting the transformation ratio thereof comprising a first transformer whose primary is the primary of the variable ratio transformer, a second transformer whose secondary is the secondary of said variable ratio transformer, a multiple of taps on said secondary for selection of a turns ratio, circuit means connecting the secondary of said first transformer with the primary of said second transformer, said circuit means including a variable resistance means for regulating the current flow through said primary of said second transformer.

References Cited in the file of this patent

UNITED STATES PATENTS

| | | |
|---|---|---|
| 1,641,737 | Clarke | Sept. 6, 1927 |
| 1,907,400 | Davis | May 2, 1933 |
| 1,994,279 | Higgins | Mar. 12, 1935 |
| 2,096,793 | Doba | Oct. 26, 1937 |
| 2,707,205 | Annis | Dec. 13, 1955 |